US011221732B2

United States Patent
Bardeli et al.

(10) Patent No.: US 11,221,732 B2
(45) Date of Patent: Jan. 11, 2022

(54) METHOD FOR DISPLAYING ICON AND ELECTRONIC DEVICE THEREFOR

(71) Applicant: Samsung Electronics Co., Ltd, Suwon-si (KR)

(72) Inventors: Lukasz Szymon Bardeli, Klobuck (PL); Grzegorz Pawel Grzesiak, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 16/492,042

(22) PCT Filed: Mar. 6, 2018

(86) PCT No.: PCT/KR2018/002631
§ 371 (c)(1),
(2) Date: Sep. 6, 2019

(87) PCT Pub. No.: WO2018/164446
PCT Pub. Date: Sep. 13, 2018

(65) Prior Publication Data
US 2021/0132776 A1 May 6, 2021

(30) Foreign Application Priority Data
Mar. 6, 2017 (KR) ........................ 10-2017-0028389

(51) Int. Cl.
*G06F 3/0481* (2013.01)
*H04M 1/27475* (2020.01)
(Continued)

(52) U.S. Cl.
CPC ........ *G06F 3/04817* (2013.01); *G06F 3/0482* (2013.01); *G06F 3/04845* (2013.01);
(Continued)

(58) Field of Classification Search
CPC ......... G06F 2203/04808; G06F 3/0482; G06F 3/04817; G06F 3/04883
See application file for complete search history.

(56) References Cited

U.S. PATENT DOCUMENTS

| 5,684,969 A | 11/1997 | Ishida |
| 6,211,856 B1 | 4/2001 | Choi et al. |
(Continued)

FOREIGN PATENT DOCUMENTS

| EP | 2713260 A1 | 4/2014 |
| EP | 2784645 A2 | 10/2014 |
(Continued)

OTHER PUBLICATIONS

Supplementary European Search Report dated Feb. 13, 2020 in connection with European Patent Application No. 18 76 4725, 12 pages.
(Continued)

*Primary Examiner* — Mong-Shune Chung

(57) ABSTRACT

The purpose of the present disclosure is generally to display at least one icon in an electronic device. A method for operating an electronic device comprises the steps of: displaying, on a screen, a plurality of icons for a plurality of applications; as a touch input for enlargement is detected through the screen, enlarging an icon of at least one application among the plurality of applications, and displaying same on the screen so as to include a shortcut function menu; and as a downward touch input on the shortcut function menu is detected, displaying a list of shortcut function menus, wherein the shortcut function menu is an interface element for directly executing a function of the at least one application.

11 Claims, 15 Drawing Sheets

(51) Int. Cl.
*G06F 3/0482* (2013.01)
*G06F 3/0484* (2013.01)
*G06F 3/0488* (2013.01)

(52) U.S. Cl.
CPC .... *G06F 3/04883* (2013.01); *H04M 1/27475* (2020.01); *G06F 2203/04806* (2013.01); *G06F 2203/04808* (2013.01)

(56) References Cited

U.S. PATENT DOCUMENTS

| | | |
|---|---|---|
| 6,501,487 B1 | 12/2002 | Taguchi |
| 8,965,459 B2 | 2/2015 | Lee et al. |
| 2005/0114796 A1 | 5/2005 | Bast |
| 2007/0157125 A1 | 7/2007 | Peters |
| 2009/0307631 A1* | 12/2009 | Kim .................. G06F 3/04883 715/830 |
| 2010/0211919 A1 | 8/2010 | Brown et al. |
| 2011/0138325 A1 | 6/2011 | Yang |
| 2011/0279388 A1 | 11/2011 | Jung et al. |
| 2012/0159386 A1 | 6/2012 | Kang et al. |
| 2012/0179969 A1 | 7/2012 | Lee et al. |
| 2013/0007665 A1* | 1/2013 | Chaudhri ............ G06F 3/0488 715/830 |
| 2013/0061172 A1 | 3/2013 | Huang et al. |
| 2013/0135234 A1* | 5/2013 | Hisano ................ G06F 3/0488 345/173 |
| 2013/0305187 A1 | 11/2013 | Phillips et al. |
| 2014/0068516 A1 | 3/2014 | Escobedo et al. |
| 2014/0096083 A1* | 4/2014 | Kim .................. G06F 3/04842 715/835 |
| 2014/0189597 A1 | 7/2014 | Kang |
| 2014/0267130 A1 | 9/2014 | Hwang et al. |
| 2014/0282214 A1* | 9/2014 | Shirzadi .............. G06F 3/04883 715/781 |
| 2015/0040065 A1 | 2/2015 | Bianco et al. |
| 2015/0106752 A1 | 4/2015 | Yang |
| 2015/0116269 A1* | 4/2015 | Kim ..................... G06F 3/0414 345/174 |
| 2016/0004416 A1* | 1/2016 | Kim .................... G06F 3/04845 715/769 |
| 2016/0259528 A1* | 9/2016 | Foss ........................ G06F 3/016 |
| 2017/0010794 A1 | 1/2017 | Cho et al. |
| 2017/0031581 A1* | 2/2017 | Chilmulwar ........ G06F 3/04847 |
| 2018/0232114 A1 | 8/2018 | Saunshi et al. |

FOREIGN PATENT DOCUMENTS

| | | |
|---|---|---|
| KR | 10-0900295 B1 | 5/2009 |
| KR | 10-2012-0029723 A | 3/2012 |
| KR | 10-2013-0006777 A | 1/2013 |
| KR | 10-2015-0130840 A | 11/2015 |
| KR | 10-1667452 B1 | 10/2016 |
| KR | 10-2017-0006579 A | 1/2017 |
| WO | 2017/018808 A1 | 2/2017 |
| WO | 2017/026732 A1 | 2/2017 |
| WO | 2017026732 A1 | 2/2017 |

OTHER PUBLICATIONS

International Search Report dated Jun. 19, 2018 in connection with International Patent Application No. PCT/KR2018/002631, 2 pages.
Written Opinion of the International Searching Authority dated Jun. 19, 2018 in connection with International Patent Application No. PCT/KR2018/002631, 7 pages.
Communication pursuant to Article 94(3) EPC dated Apr. 14, 2021 in connection with European Patent Application No. 18 764 725.0, 10, pages.
Office Action dated Feb. 22, 2021 in connection with India Patent Application No. 201917039111, 6 pages.
Notice of Preliminary Rejection dated May 10, 2021, in connection with Korean Patent Application No. 10-2017-0028389, 11 pages.
Notice of Patent Grant dated Nov. 5, 2021 in connection with Korean Patent Application No. 10-2017-0028389, 3 pages.

\* cited by examiner

METHOD FOR DISPLAYING ICON AND ELECTRONIC DEVICE THEREFOR

CROSS-REFERENCE TO RELATED APPLICATIONS

This application is a 371 of International Application No. PCT/KR2018/002631 filed on Mar. 6, 2018, which claims priority to Korean Patent Application No. 10-2017-0028389 filed on Mar. 6, 2017, the disclosures of which are herein incorporated by reference in their entirety.

BACKGROUND

1. Field

The disclosure relates to displaying a screen of an electronic device and, more particularly, to a method and apparatus for displaying an icon on a screen of an electronic device.

2. Description of Related Art

As digital technology has developed, various types of electronic devices equipped with touch screens have been popularly used, such as a mobile communication terminal, a personal digital assistant (PDA), an electronic organizer, a smart phone, a tablet personal computer (PC), a wearable device, or the like. The touch screen refers to a screen that is capable of directly receiving information input via the screen, as opposed to using a separate input device, such as a keyboard or the like. Accordingly, an area where a hand of a user or an object is in contact with a character or a predetermined location on the screen is recognized, and predetermined processing is performed on the basis of stored software.

As described above, an electronic device including a touch screen has been improved to increase user convenience by enabling a user to intuitively operate a screen from the perspective of a user interface (UI)/user experience (UX). Particularly, an electronic device including various installed applications may easily execute various complex functions of applications via a UI/UX design made in consideration of user convenience.

SUMMARY

As described above, the disclosure provides a method for effectively displaying an icon on a screen of an electronic device and an electronic device therefor.

The disclosure provides a method of changing icons displayed on a screen of an electronic device according to the type of touch input, and displaying changed icons, and an electronic device therefor.

The disclosure provides a method of providing a shortcut menu for executing the function of an application according to a touch input, and an electronic device therefor.

The disclosure provides a method of displaying a shortcut icon via a simple touch, so that the function of an application is more conveniently executed, and an electronic device therefor.

In accordance with an aspect of the disclosure, an operation method of an electronic device may include: displaying a plurality of icons for a plurality of applications on a screen; when a touch input for scaling up is detected via the screen, scaling up an icon of at least one of the plurality of applications and displaying the scaled-up icon including a shortcut function menu on the screen; and when a downward touch input on the shortcut function menu is detected, displaying a list related to the shortcut function menu, wherein the shortcut function menu is an interface element for immediately executing a function of the at least one application.

In accordance with another aspect of the disclosure, an electronic device may include: a display; and a controller functionally connected to the display, wherein the controller is configured to: display a plurality of icons for a plurality of applications; scale up an icon of at least one of the plurality of applications when a touch input for scaling up is detected via a screen, and display the scaled-up icon including a shortcut function menu on the screen; and display a list related to the shortcut function menu when a downward touch input on the shortcut function menu is detected, wherein the shortcut function menu is an interface element for immediately executing the at least one application function.

A method and an electronic device therefor according to various embodiments may provide a method of displaying an icon more quickly and conveniently in terms of a user interface (UI)/user experience (UX), according to user touch input.

Effects which can be acquired by the disclosure are not limited to the above described effects, and other effects that have not been mentioned may be clearly understood by those skilled in the art from the following description.

DETAILED DESCRIPTION

Figure 1:
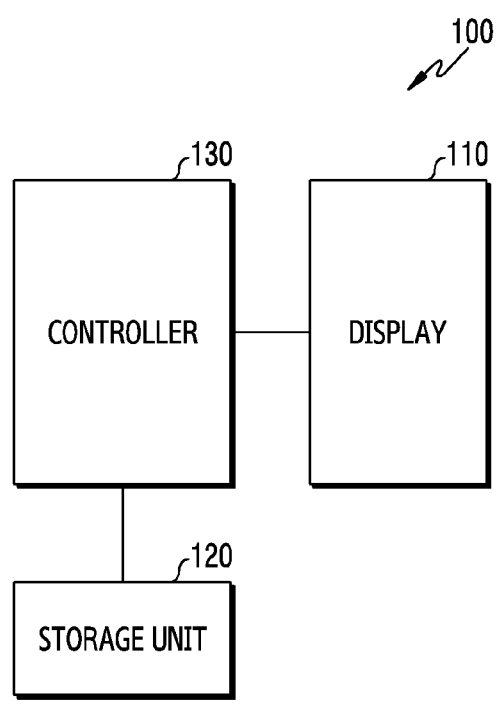
FIG. 1 is a block diagram of an electronic device according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to a method for displaying application icons in an electronic device, and an electronic device therefor. Particularly, the disclosure describes an icon displaying technology which enables quick access to an application function menu on the basis of various touch inputs, in order to increase convenience of a user who uses an electronic device.

Hereinafter, terms indicating control information, terms indicating elements (e.g., a touch screen) of an apparatus, or the like are used for ease of description. Accordingly, the disclosure is not limited to the following terms and other terms having the same technical meaning may be used.

Also, various embodiments of the disclosure may be easily modified and applied to various types of electronic devices equipped with touch screens.

In order to execute a function of a predetermined application in an existing electronic device equipped with a touch screen, a user needs to select a corresponding application icon, and needs to search for a desired menu from an application execution screen so as to execute a submenu. For example, when a user desires to call to a predetermined person who the user frequently talks with over a smart phone, the user may need to run a call application, and may need to search for the name or the phone number of the predetermined person from a call application screen or may need to execute a menu such as recent calls or the like, so as to make a call to the predetermined person whom the user desires to talk with. That is, in order to execute the final application function that the user desires, the user may need to execute several upper menus, which is inconvenient. Therefore, in order to improve convenience when the user executes an application function, there is proposed a method of directly displaying a lower function menu of an application via a simple and intuitive touch input.

FIG. 1 is a block diagram illustrating an electronic device 100 according to various embodiments. The term ". . . unit" or the ending of a word, such as ". . . or", ". . . er", or the like may indicate a unit of processing at least one function or operation, and this may be implemented as hardware, software, or a combination of hardware and software.

The electronic device 100 according to various embodiments may include at least one from among, for example, a smart phone, a table personal computer (PC), a mobile phone, a video phone, an e-book reader, a desktop PC, a laptop PC, a netbook computer, a workstation, a server, a personal digital assistants (PDA), a portable multimedia player (PMP), a moving picture experts group (MPEG)-1 audio layer 3 (MP3) player, a medical device, or a camera, or a wearable device. The wearable device may include at least one of an accessory type device (e.g., a watch, a ring, a bracelet, an anklet, a necklace, glasses, contact lens, or a Head-Mounted Device (HMD)), a fabric or clothing integrated type device (e.g., an electronic clothing), a body-mounted type device (e.g., a skin pad, or tattoo), and a bio-implantable type circuit. In some embodiments, the electronic device 100 may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV', or Google TV™), a game console (e.g., Xbox™ and PlayStation™), an electronic dictionary, an electronic key, a camcorder, and an electronic photo frame.

In other embodiments, the electronic device 100 may include at least one of the various medical devices (e.g., various portable medical measuring devices (a blood glucose monitoring device, a heart rate monitoring device, a blood pressure measuring device, a body temperature measuring device, or the like), a magnetic resonance angiography (MRA), a magnetic resonance imaging (MM), a computed tomography (CT) machine, and an ultrasonic machine), a navigation device, a global navigation satellite system (GNSS), an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, a drone, an automatic teller's machine (ATM) in banks, point of sales (POS) in a shop, or internet of things devices (e.g., a light bulb, various sensors, a sprinkler device, a fire alarm, a thermostat, a streetlamp, a toaster, a sporting goods, a hot water tank, a heater, a boiler, or the like). According to some embodiments, the electronic device 100 may include at least one of furniture, a part of a building/structure or a vehicle, an electronic board, an electronic signature receiving device, a projector, and various types of measuring instruments (e.g., a water meter, an electric meter, a gas meter, a radio wave meter, and the like). In various embodiments, the electronic device 100 may be flexible, or may be a combination of one or more of the aforementioned various devices. The electronic device according to an embodiment is not limited to the above-described devices. As used herein, the term "user" may indicate a person who uses an electronic device or a device (e.g., an artificial intelligence electronic device) that uses an electronic device.

Referring to FIG. 1, the electronic device 100 may include a display 110, a storage unit 120, and a controller 130.

The display 110 may output information, and may perform functions of detecting a user input. The display 110 may transfer a command or data input from a user to the controller 130. To this end, the display 110 may include at least one hardware module for performing input and output. For example, the hardware module may include at least one from among a sensor, a keyboard, a keypad, a speaker, a microphone, a touch screen, a liquid crystal display (LCD), a light emitting diode (LED), a light emitting polymer display (LPD), an organic light emitting diode (OLED), an active matrix organic light emitting diode (AMOLED), and a flexible LED (FLED). For example, the display 110 may provide, to the controller 130, data associated with a touch input provided by a user via a touch screen, such as a tap input, a double-tap input, a hold input, a drag-and-drop input, a press input, a pinch input, a stretch input, a slide input, a swipe input, a rotate input, a flicking input, or the like. For example, a tap input may be a motion of selecting an object from a touch screen or a motion of executing the function of an object. A double-tap input may be a motion of returning to a default view while an operation of scaling up or down a screen is performed. A hold input is a motion of holding a touch during a predetermined period of time, which may be a motion for executing a predetermined function. According to an embodiment, a hold input may be a motion of switching to an edition mode. According to another embodiment, a hold input may be a motion of selecting text in an application. A drag-and-drop input may be a motion of touching a screen and dragging the touch by holding the touch. For example, a drag-and-drop input may be a motion of moving an object to a desired location. A pinch input may be a motion of scaling up or down a screen. A flicking input may be a motion of touching a screen, moving the touch by holding the touch, and releasing the touch. For example, flicking may be a motion of opening an option menu or a motion of scrolling a list.

Particularly, according to various embodiments, the display 110 may display information associated with a lower step currently determined by the controller 130. Also, the display 110 may output a command or data received from the controller 130 via a screen. The display 110 may display a screen, and may be referred to as a "display unit" or a "display". Also, the display 110 may detect a user input, and may be referred to as an "input unit".

The storage unit 120 may store data, such as a basic program for operating the electronic device 100, an application program, configuration information, and the like. Particularly, the storage unit 120 may store an algorithm or a software program for displaying a screen according to various touch inputs (e.g., a pinch zoom-in, pinch zoom-out, a flicking up, flicking down, flicking right, or the like). Also, the storage unit 120 may classify contacts, call logs, message logs, a list of e-mails, a list of schedules, or the like according to predetermined criteria (e.g., a predetermined period of time, a predetermined number, and the like). In addition, the storage unit 120 may provide data stored therein in response to a request from the controller 130.

The controller 130 may control overall operation of the electronic device 100. For example, the controller 130 may record data in, or read data from, the storage unit 120. To this end, the controller 130 may include at least one processor or a micro-processor, or may be a part of a processor. Also, the controller 130 may be referred to as an application processor (AP). For example, the controller 130 may transmit or receive a signal via a communication unit (not illustrated). Also, for example, the controller 130 may analyze the type of touch input of a detected touch input according to various embodiments to be described below, and may control various functions for displaying an icon on a screen according to the analyzed type of touch input. Particularly, the controller 130 may perform control so as to determine information to be displayed according to the type of touch input, to extract related information from the storage unit 120, and to display the extracted information in a predetermined form via the display 110.

Although not illustrated in FIG. 1, the electronic device 100 may further include a communication unit. The communication unit executes functions for transmitting or receiving a signal via a wireless channel. For example, the communication unit performs a function of conversion between a baseband signal and a bit stream according to a physical layer standard of the system. Also, the communication unit may include different communication modules for processing signals in different frequency bands. For example, the different communication standards may include Bluetooth low energy (BLE), wireless fidelity (Wi-Fi), WiFi gigabyte (WiGig), a cellular network (e.g., long term evolution (LTE)), and the like. The communication unit may transmit or receive a signal, and may be referred to as a transmitter, a receiver, or a transceiver.

Figure 2:
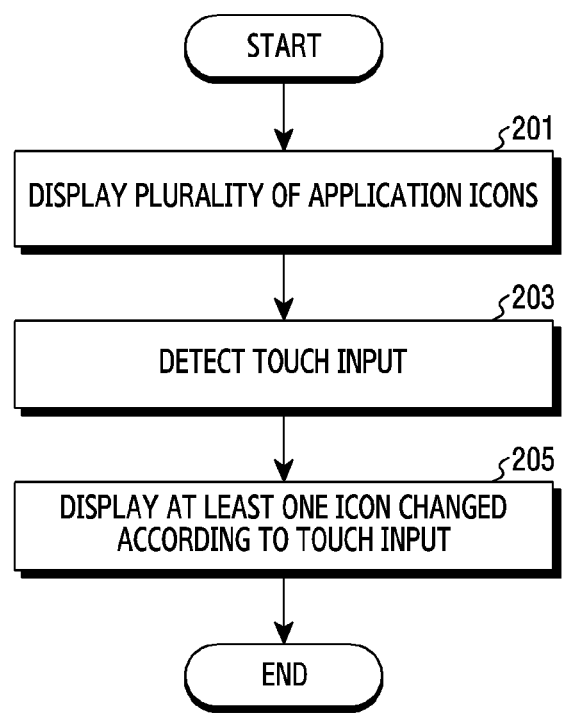
FIG. 2 is a flowchart illustrating a normal process of displaying a screen according to a touch input in an electronic device according to various embodiments.

FIG. 2 is a flowchart illustrating a normal process of displaying a screen according to a touch input in an electronic device according to various embodiments. FIG. 2 illustrates the operation method of the electronic device 100.

Referring to FIG. 2, the electronic device may display icons of a plurality of applications in operation 201. For example, the electronic device may display a plurality of application icons via the display 110. According to an embodiment, when a home button is selected in the electronic device, a screen including a plurality of application icons may be displayed.

In operation 203, the electronic device may detect a touch input. For example, the electronic device may detect a touch input on a screen that displays a plurality of application icons via the display 110. That is, the electronic device may detect a touch input provided by a user via a touch screen. According to an embodiment, the display 110 may detect a touch input such as a tap input, a double-tap input, a hold input, a drag-and-drop input, a press input, a pinch input, a stretch input, a slide input, a swipe input, a rotate input, a flicking input or the like, and may provide data associated with the detected touch input to the controller 130.

In operation 205, the electronic device may display at least one icon changed according to a touch input. For example, the electronic device determines the type of touch input of the detected touch input, and may change at least one icon according to the type of touch input and display a changed icon via the display 110. That is, the controller 130 may determine the direction of a touch input such as a detected pinch or flicking input, a touch area, the type of touch input, and the like, may determine an icon corresponding to the corresponding touch input and a screen to be modified to, and may display a screen including at least one changed icon via the display 110.

According to an embodiment, a process of controlling displaying of a screen according to various touch inputs may be performed as shown in FIGS. 3 to 12.

Figure 3:
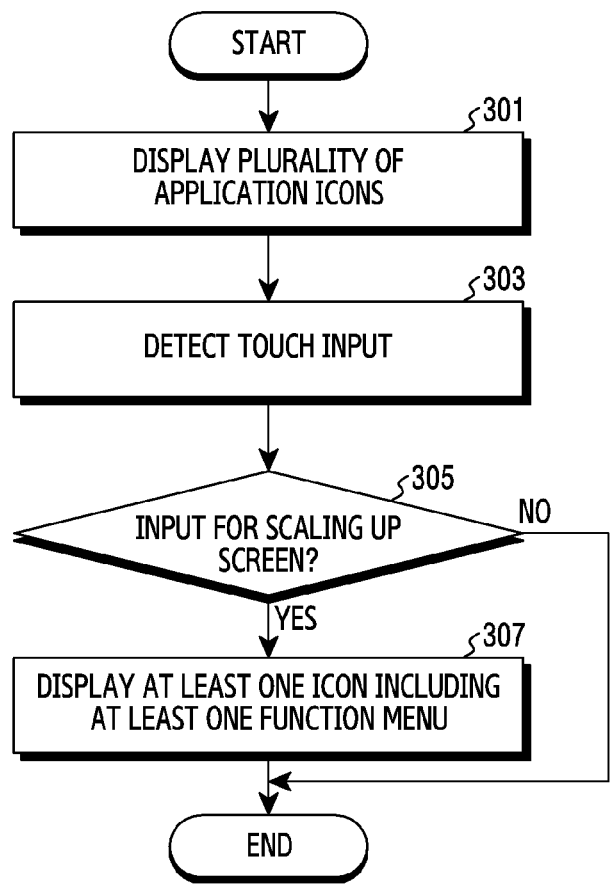
FIG. 3 is a flowchart illustrating a process of displaying a screen according to a touch input for scaling up a screen in an electronic device according to various embodiments.

FIG. 3 is a flowchart illustrating a process of displaying a screen according to a touch input for scaling up a screen in an electronic device according to various embodiments. FIG. 3 illustrates the operation method of the electronic device 100.

Figure 4A:
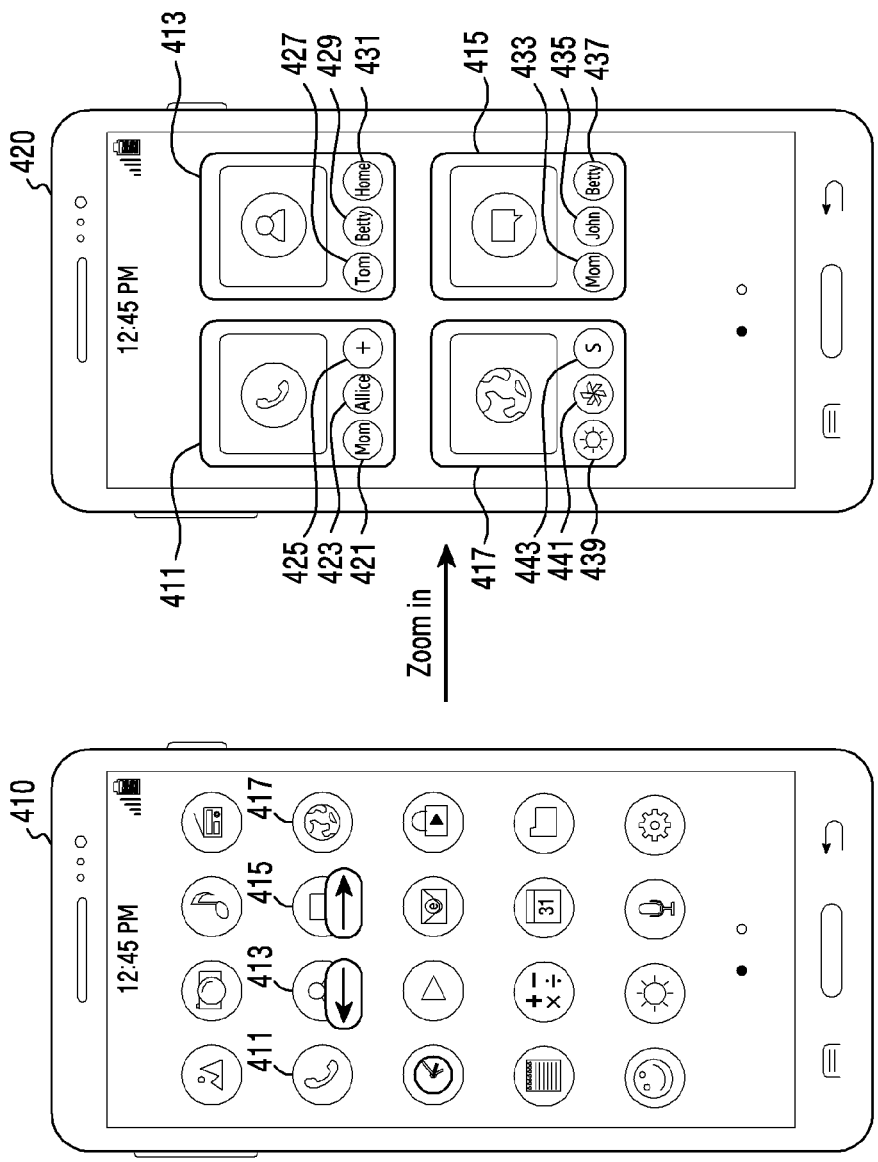
FIG. 4A is a diagram illustrating an example of displaying scaled-up icons (2×2) according to a touch input for scaling up a screen in an electronic device according to various embodiments.
Figure 4B:
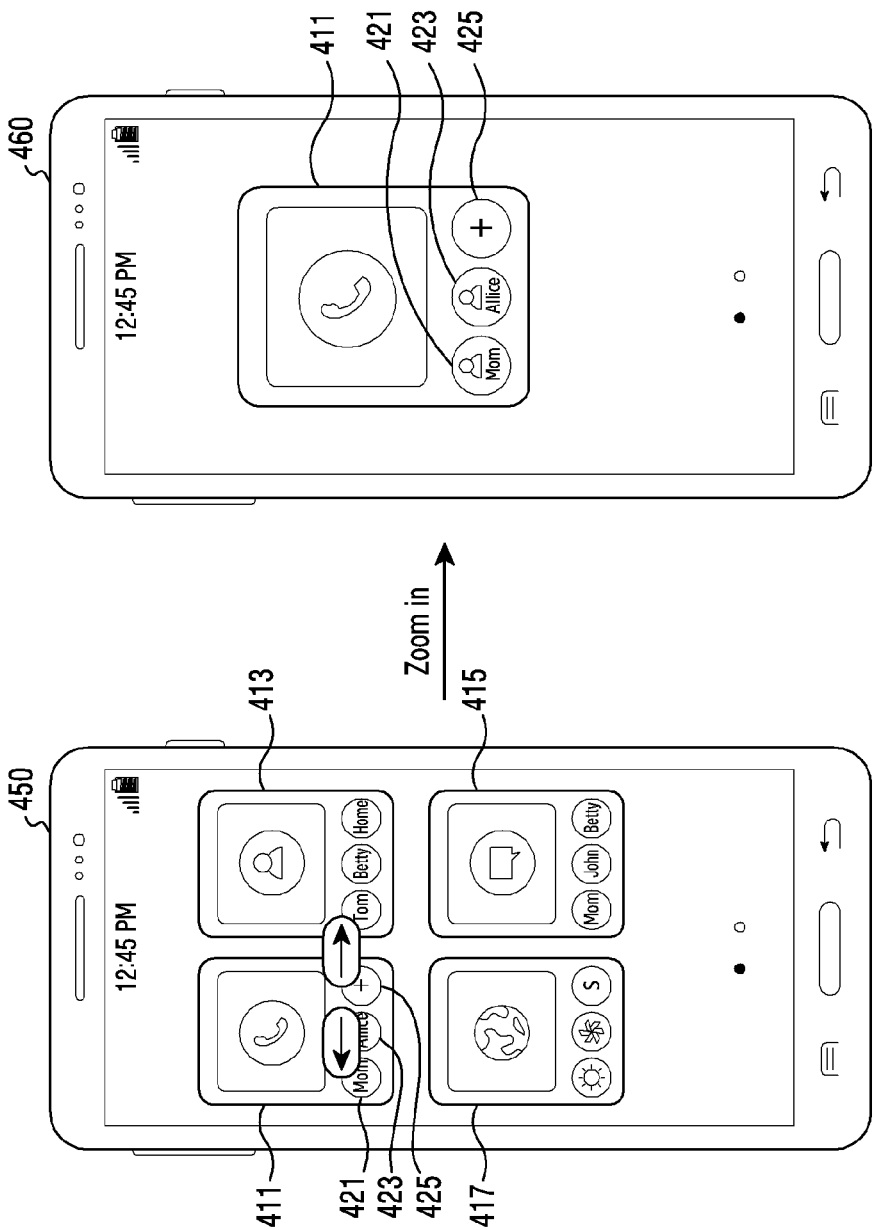
FIG. 4B is a diagram illustrating an example of displaying a scaled-up icon (single) according to a touch input for scaling up a screen in an electronic device according to various embodiments.

Referring to FIG. 3, the electronic device may display a plurality of application icons in operation 301. For example, the electronic device may display a plurality of application icons via the display 110. According to an embodiment, when a home screen is displayed in the electronic device, such as a smart phone, a screen including icons of a plurality of applications may be displayed. For example, the screen that displays the icons may be displayed as shown in FIGS. 4A and 4B. According to an embodiment, referring to FIG. 4A, the screen that displays the plurality of application icons may be displayed as a home screen such as a first screen 410. The first screen 410 may include simple icons associated with various applications such as a picture, a camera, a media player, and the like. Particularly, the first screen 410 may include icons of a communication application 411, a contact information application 413, a message application 415, and a web browser application 417. According to another embodiment, referring to FIG. 4B, the screen that displays the plurality of application icons may be displayed as a third screen 450. The third screen 450 may include icons arranged in a 2×2 disposition, including the call application 411, the contact information application 413, the message application 415, and the web browser application 417. According to other embodiments, the third screen 450 may include 12 icons arranged in a 3×4 disposition. The third screen 450 may be a screen obtained by scaling up the home screen via a single pinch zoom-in input, and may include the icon of the communication application 411 including predetermined contact information shortcut function menus 421 and 423 (e.g., mom, Alice, or the like) and a shortcut addition function menu 425.

In operation 303, the electronic device may detect a touch input. For example, the electronic device may detect a touch input on a screen that displays a plurality of application icons via the display 110. According to an embodiment, the display 110 may detect a touch input such as a tap input, a double-tap input, a hold input, a drag-and-drop input, a press input, a pinch input, a stretch input, a slide input, a swipe input, a rotate input, a flicking input or the like, and may provide data associated with the detected touch input to the controller 130. For example, the screen that detects a touch input may be displayed as shown in FIGS. 4A and 4B. According to an embodiment, referring to FIG. 4A, a touch input on the first screen 410 that displays the plurality of application icons may be detected. The touch input on the first screen 410 may be detected from an area where the call application 411, the contact information application 413, the message application 415, and the web browser application 417 are displayed or from a related area. According to another embodiment, referring to FIG. 4B, a touch input on the third screen 450 that displays a plurality of application icons may be detected. The touch input on the third screen 450 may be detected from an area related to the call application 411.

In operation 305, the electronic device determines whether the detected touch input is an input for scaling up a screen. For example, the controller 130 may determine whether the data associated with the detected touch input is a touch input for scaling up a screen. Here, an input for scaling up a screen may be defined variously. According to an embodiment, an input for scaling up a screen may be defined as a pinch zoom-in. The controller 130 may determine whether the detected touch input is a pinch zoom-in input for scaling up a screen on the basis of the touch area, the touch direction, and the touch time of the detected touch input. For example, the controller 130 may select application icons to be displayed on a scaled-up screen on the basis of the touch input of the detected touch input. As another example, the controller 130 may select application icons to be displayed on a scaled-up screen on the basis of predetermined configuration information. When it is determined that the touch input is not an input for scaling up a screen, the electronic device may terminate the algorithm.

When it is determined that the touch input is an input for scaling up a screen, the electronic device may display at least one icon including at least one function menu according to the touch input in operation 307. For example, since it is determined that the detected touch input is a touch input for scaling up a screen, the electronic device may modify at least one icon to be in a form including at least one function menu and may display the same. That is, when it is determined that the detected input is a pinch zoom-in input, the controller 130 may determine the direction of the touch input, a touch area, the type of touch input, and the like, may determine an icon corresponding to the corresponding touch input and a screen to be modified to, and may display the screen including at least one modified icon via the display 110. For example, as shown in FIGS. 4A and 4B, a screen including a reduced number of at least one icon since the at least one icon is scaled up according to the touch input for scaling up a screen, may be displayed. According to an embodiment, referring to FIG. 4A, a screen that displays at least one icon including at least one function menu may be displayed as a second screen 420. The second screen 420 may include the call application 411, the contact information application 413, the message application 415, and the web browser application 417 according to the area of the touch input detected in operation 303. According to other embodiments, at least one icon to be included in the second screen 420, which is scaled-up screen, may be determined according to a predetermined criterion corresponding to the screen scale-up touch input, or according to the order of frequently used applications. The icon of the call application 411 may include the predetermined contact information shortcut function menus 421 and 423 (e.g., mom, Alice, and the like), and the shortcut addition function menu 425. In this instance, the shortcut function menus may be determined on the basis of contact information set in advance by a user. According to other embodiments, the shortcut function menus may be determined on the basis of contact information which is frequently used for making a call within a predetermined period of time (e.g., past one week) or contact information which is most recently used. The icon of the contact information application 413 may include predetermined contact information shortcut function menus 427, 429 and 431 (e.g., Tom, Betty, home, and the like). In this instance, the shortcut function menus may be determined on the basis of contact information set in advance by a user. According to other embodiments, the shortcut function menus may be determined on the basis of contact information which a user frequently uses for making a call within a predetermined period of time (e.g., past one week) or contact information which is most recently used. The icon of the text application 415 may include predetermined contact information shortcut function menus 433, 435 and 437 (e.g., mom, John, Betty, and the like). In this instance, the shortcut function menus may be determined on the basis of contact information set in advance by a user. According to other embodiments, the shortcut function menus may be determined on the basis of contact information which a user frequently uses for texting within a predetermined period of time (e.g., past one week) or contact information which is most recently used. The icon of the Internet application 417 may include predetermined browser function menus 439, 441, and 443 (e.g., Chrome and the like). In this instance, the browser function menus may be determined on the basis of preferred browser information set in advance by a user. According to other embodiments, the browser function menus may be determined on the basis of browser information which a user frequently uses within a predetermined period of time (e.g., past one week) or browser information which is most recently used. According to other embodiments, referring to FIG. 4B, a screen that displays at least one icon including at least one function menu may be displayed as a fourth screen 460. The fourth screen 460 may be a single icon screen including the call application 411, depending on the area of the touch input detected in operation 303. At least one icon to be included in the fourth screen 460, which is a scaled-up screen, may be determined according to a predetermined criterion corresponding to a screen scale-up touch input, or according to the order of frequently used applications. The scaled-up icon of the call application 411 may include the predetermined contact information shortcut function menus 421 and 423 (e.g., mom, Alice, and the like), and the shortcut addition function menu 425. Unlike the third screen 450, shortcut function menus associated with other contacts or other function menus may be included, in addition to the shortcut function menus 421 and 423 and the shortcut addition function menu 425. The icons including function menus illustrated in FIGS. 4A and 4B may be referred to as extended icons, expanded icons, complex icons, or other terms having technical meanings equivalent to them.

Figure 5:
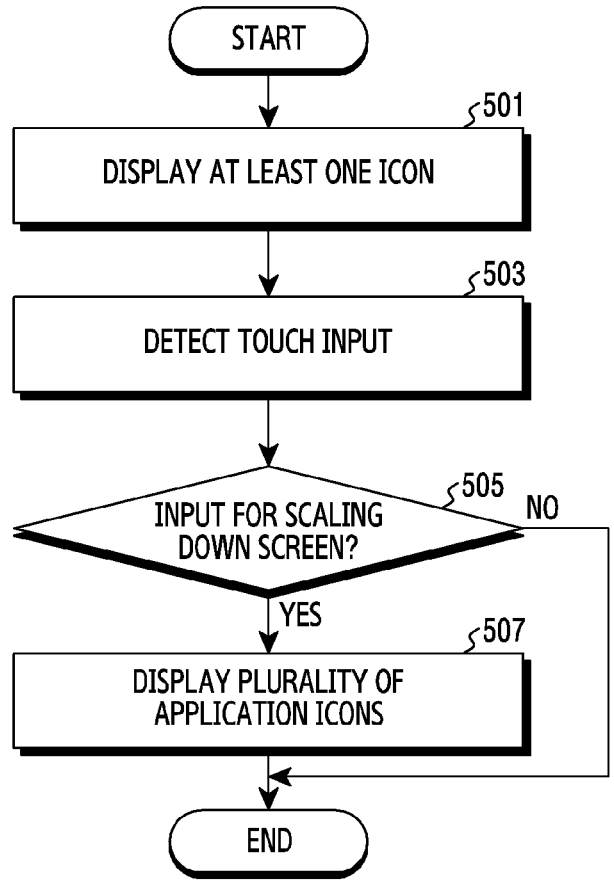
FIG. 5 is a flowchart illustrating a process of displaying a screen according to a touch input for scaling down a screen in an electronic device according to various embodiments.

FIG. 5 is a flowchart illustrating a process of displaying a screen according to a touch input for scaling down a screen in an electronic device according to various embodiments. FIG. 5 illustrates the operation method of the electronic device 100.

Figure 6A:
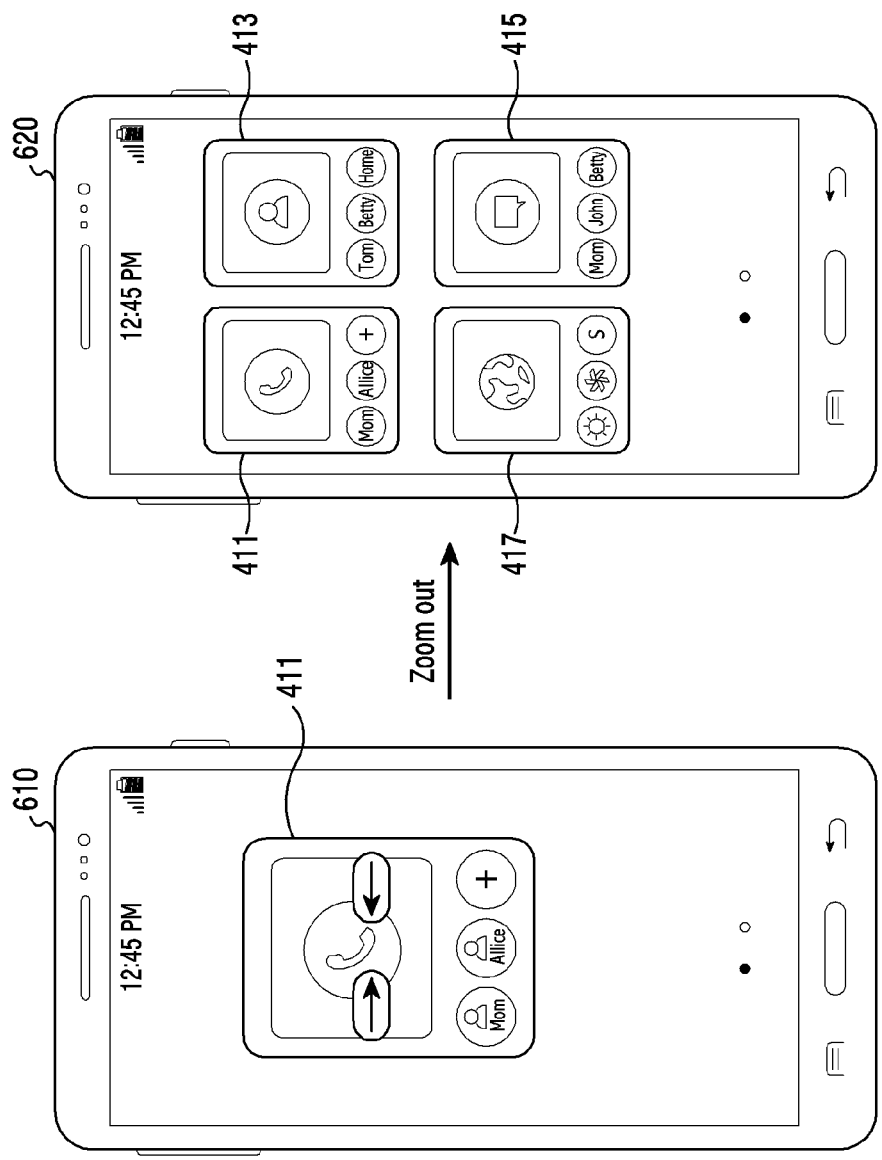
FIG. 6A is a diagram illustrating an example of displaying scaled-down icons (2×2) according to a touch input for scaling down a screen in an electronic device according to various embodiments.
Figure 6B:
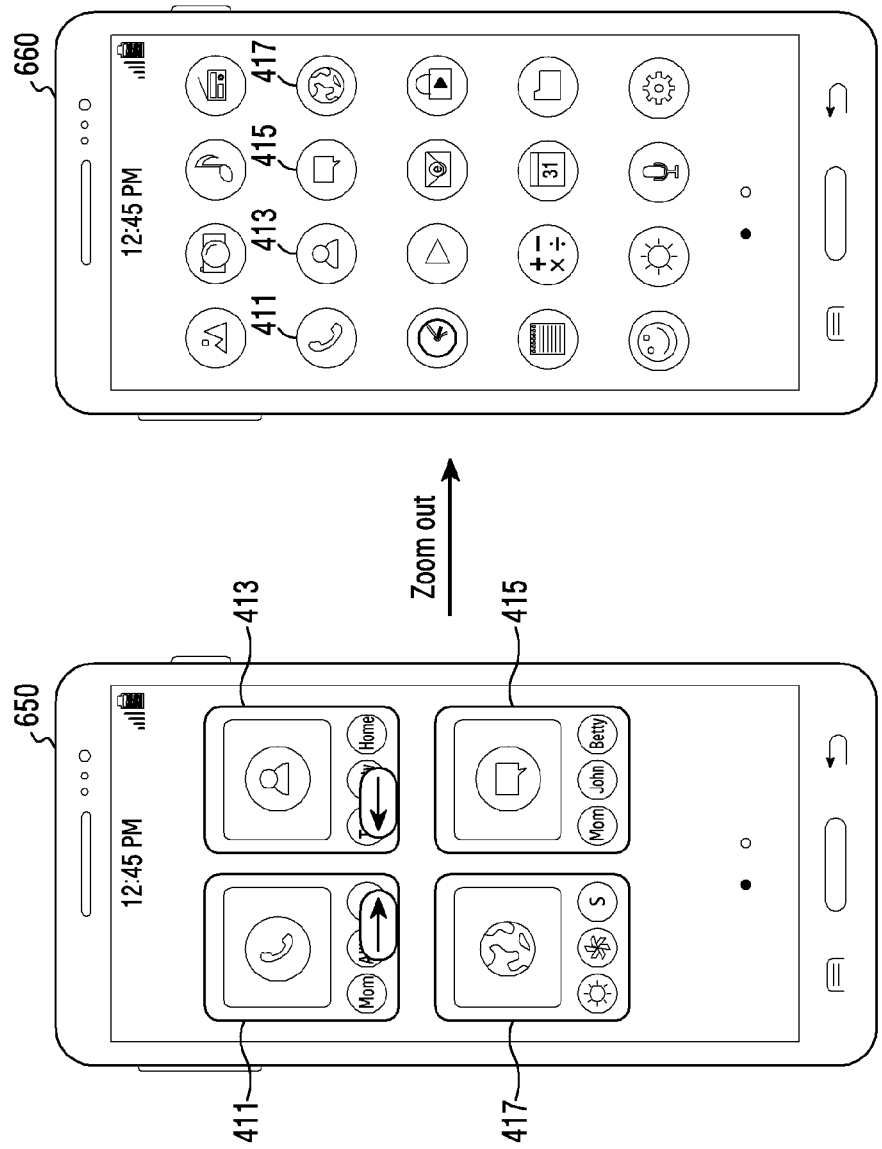
FIG. 6B is a diagram illustrating an example of displaying scaled-down icons (multiple) according to a touch input for scaling down a screen in an electronic device according to various embodiments.

Referring to FIG. 5, the electronic device may display at least one icon in operation 501. For example, the electronic device may display at least one application icon via the display 110. According to an embodiment, a screen including an icon related to at least one application including at least one function menu may be displayed in an electronic device, such as a smart phone. For example, the screen that displays an icon may be displayed as shown in FIGS. 6A and 6B. According to an embodiment, referring to FIG. 6A, the screen that displays at least one application icon may be displayed as a first screen 610 including a single icon. The first screen 610 may include the icon of the call application 411. The icon of the call application 411 may include the predetermined contact information shortcut function menus 421 and 423 (e.g., mom, Alice, and the like), and the shortcut addition function menu 425. Unlike a third screen 650, the icon of the call application 411 of the first screen 610 may include shortcut function menus associated with other contacts or other function menus, in addition to the shortcut function menus 421 and 423, and the shortcut addition function menu 425. According to other embodiments, referring to FIG. 6B, the screen that displays at least one application icon may be displayed as the third screen 650. The third screen 650 may include icons arranged in a 2×2 disposition, including the call application 411, the contact information application 413, the message application 415, and the web browser application 417. The third screen 650 may include the icon of the call application 411 including the predetermined contact information shortcut function menus 421 and 423 (e.g., mom, Alice, and the like), and the shortcut addition function menu 425.

In operation 503, the electronic device may detect a touch input. For example, the electronic device may detect a touch input on a screen that displays a plurality of application icons via the display 110. According to an embodiment, the display 110 may detect a touch input such as a tap input, a double-tap input, a hold input, a drag-and-drop input, a press input, a pinch input, a stretch input, a slide input, a swipe input, a rotate input, a flicking input or the like, and may provide data associated with the detected touch input to the controller 130. For example, the screen that detects a touch input may be displayed as shown in FIGS. 6A and 6B. According to an embodiment, referring to FIG. 6A, a touch input on the first screen 610 that displays a single icon may be detected. According to another embodiment, referring to FIG. 6B, a touch input on the third screen 650 that displays at least one application icon in a 2×2 disposition may be detected. The touch input on the third screen 650 may be detected from an area related to the call application 411.

In operation 505, the electronic device determines whether the detected touch input is an input for scaling down a screen. For example, the controller 130 may determine whether the data associated with the detected touch input is a touch input for scaling down a screen. Here, an input for scaling down a screen may be defined variously. According to an embodiment, an input for scaling down a screen may be defined as a pinch zoom-out. The controller 130 may determine whether the detected touch input is a pinch zoom-out input for scaling down a screen on the basis of the touch area, the touch direction, and the touch time of the detected touch input. For example, the controller 130 may determine a scaled-down screen configuration to be displayed on the basis of the detected touch input. As another example, the controller 130 may select application icons to be displayed on a scaled-down screen on the basis of predetermined configuration information. When it is determined that the touch input is not an input for scaling down a screen, the electronic device may terminate the algorithm.

When it is determined that the touch input is an input for scaling down a screen, the electronic device may display a plurality of application icons according to the touch input in operation 507. For example, since it is determined that the detected touch input is a touch input for scaling down a screen, the electronic device may display a plurality of application icons including the at least one icon displayed in operation 501. That is, when it is determined that the detected input is a pinch zoom-out input, the controller 130 may determine the direction of the touch input, a touch area, the type of touch input, and the like, may determine an icon corresponding to the corresponding touch input and a screen to be modified to, and may display the modified screen including a plurality of application icons via the display 110. For example, as shown in FIGS. 6A and 6B, a screen that displays an increased number of icons since the icons are scaled down according to the touch input for scaling down a screen, may be displayed. According to an embodiment, referring to FIG. 6A, a screen that displays a plurality of application icons including at least one function menu may be displayed as the second screen 620. According to the screen scale-down touch input detected in operation 503, the first screen 610 including only the call application 411 may be changed to the second screen 620 including the call application 411, the contact information application 413, the message application 415, and the web browser application 417. When a home screen is scaled up according to operations 301 to 307, the icons included in the second screen 620 which is a scaled-down screen may be determined on the basis of a touch area, may be determined according to a predetermined criterion corresponding to a screen scale-up touch input, or may be determined according to the order of frequently used applications. The icon of the call application 411 may include the predetermined contact information shortcut function menus 421 and 423 (e.g., mom, Alice, and the like), and the shortcut addition function menu 425. In this instance, the shortcut function menus may be determined on the basis of contact information set in advance by a user. According to other embodiments, the shortcut function menus may be determined on the basis of contact information which a user frequently uses for making a call within a predetermined period of time (e.g., past one week) or contact information which is most recently used. The icon of the contact information application 413 may include predetermined contact information shortcut function menus 427, 429 and 431 (e.g., Tom, Betty, home, and the like). In this instance, the shortcut function menus may be determined on the basis of contact information set in advance by a user. According to other embodiments, the shortcut function menus may be determined on the basis of contact information which a user frequently uses for making a call within a predetermined period of time (e.g., past one week) or contact information which is most recently used. The icon of the text application 415 may include predetermined contact information shortcut function menus 433, 435 and 437 (e.g., mom, John, Betty, and the like). In this instance, the shortcut function menus may be determined on the basis of contact information set in advance by a user. According to other embodiments, the shortcut function menus may be determined on the basis of contact information which a user frequently uses for texting within a predetermined period of time (e.g., past one week) or contact information which is most recently used. The icon of the Internet application 417 may include predetermined browser function menus 439, 441, and 443 (e.g., Chrome and the like). In this instance, the browser function menus may be determined on the basis of browser information set in advance by a user. According to other embodiments, the browser function menus may be determined on the basis of browser information which a user frequently uses within a predetermined period of time (e.g., past one week) or browser information which was is recently used. According to another embodiment, referring to FIG. 6B, a screen that displays a plurality of application icons may be displayed as a fourth screen 660. The fourth screen 660 may be a home screen including a plurality of application icons in a smart phone. The fourth screen 660 may display simple icons associated with various applications such as a picture, a camera, a media player, and the like. Particularly, the fourth screen 660 may include icons of the communication application 411, the contact information application 413, the message application 415, and the web browser application 417.

Figure 7:
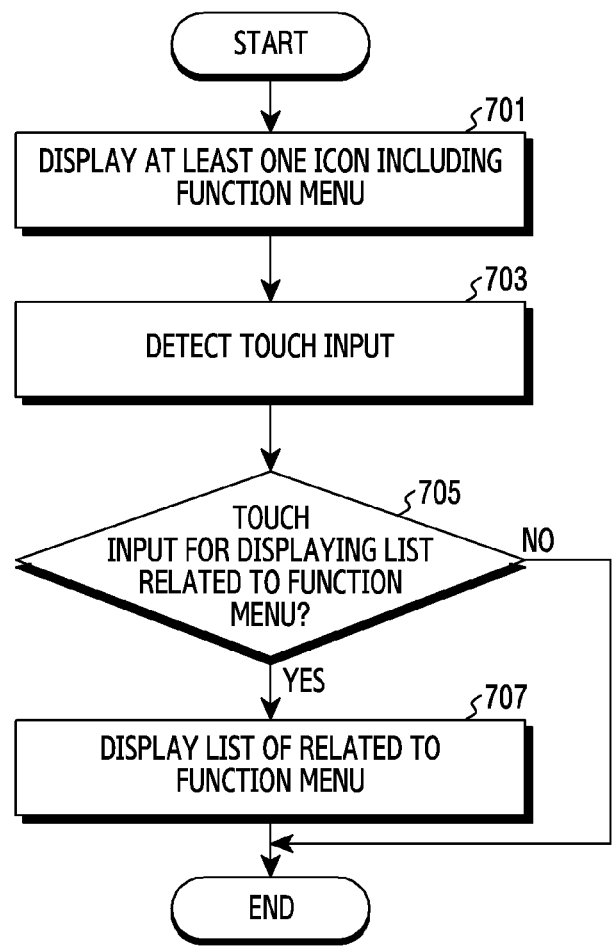
FIG. 7 is a flowchart illustrating a process of displaying a screen according to a touch input for displaying a list related to a function menu in an electronic device according to various embodiments.

FIG. 7 is a flowchart illustrating a process of displaying a screen according to a touch input for displaying a list related to a function menu in an electronic device according to various embodiments. FIG. 7 illustrates the operation method of the electronic device 100.

Figure 8:
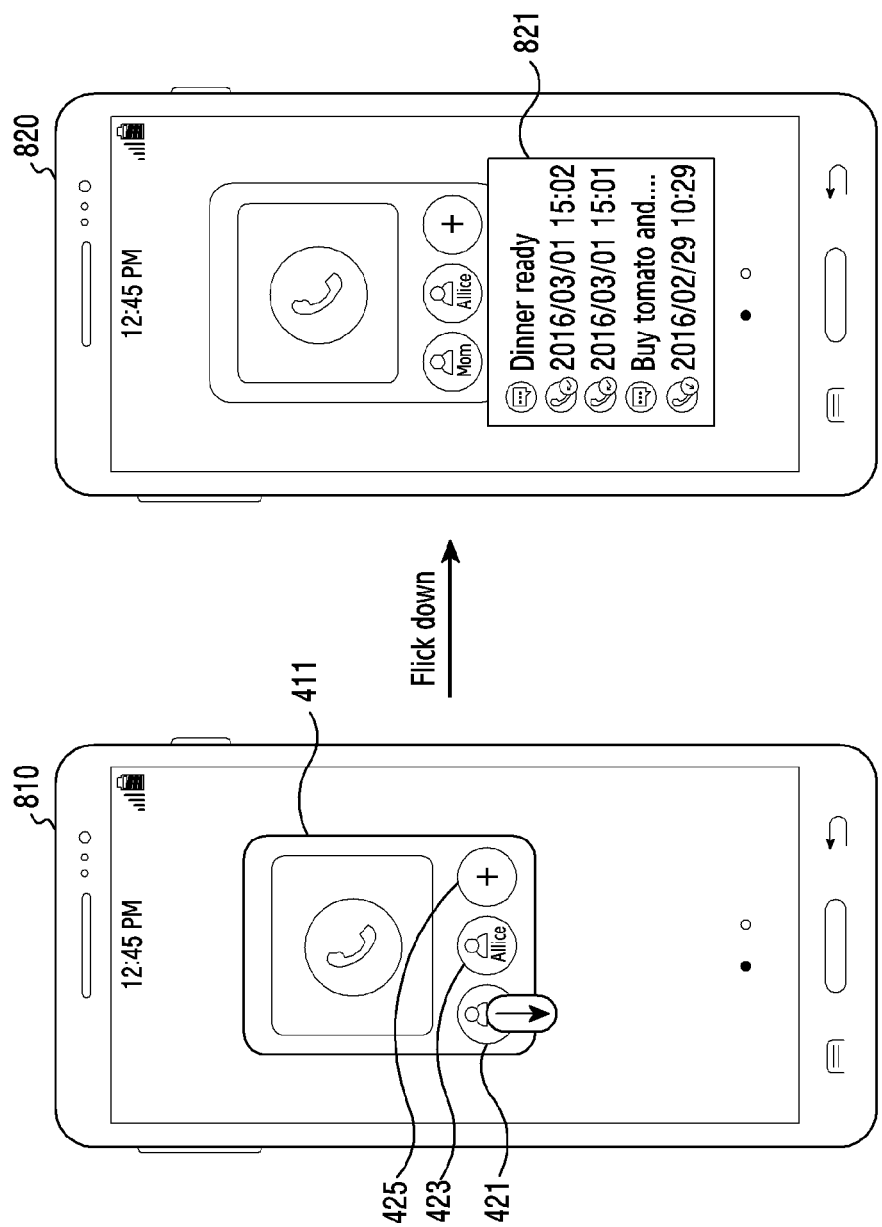
FIG. 8 is a diagram illustrating an example of displaying a list related to a function menu according to a touch input for displaying a list related to a function menu in an electronic device according to various embodiments.

Referring to FIG. 7, the electronic device may display at least one icon including a function menu in operation 701. For example, the electronic device may display at least one icon including a function menu via the display 110. According to an embodiment, the at least one icon may be displayed in the form of a widget. For example, the screen that displays an icon may be as shown in FIG. 8. According to an embodiment, referring to FIG. 8, the screen that displays at least one icon including a function menu may be displayed as a first screen 810 including a single icon. The first screen 810 may include the icon of the call application 411. The icon of the call application 411 may include the predetermined contact information shortcut function menus 421 and 423 (e.g., mom, Alice, and the like), and the shortcut addition function menu 425. The icon of the call application 411 may include more shortcut function menus. According to other embodiments, the screen that displays at least one icon including a function menu may include a plurality of icons configured in a 2×2 disposition like the second screen 420 of FIG. 4A.

In operation 703, the electronic device may detect a touch input. For example, the electronic device may detect a touch input on the screen that displays at least one icon including a function menu via the display 110. According to an embodiment, the display 110 may detect a touch input such as a tap input, a double-tap input, a hold input, a drag-and-drop input, a press input, a pinch input, a stretch input, a slide input, a swipe input, a rotate input, a flicking input or the like, and may provide data associated with the detected touch input to the controller 130. For example, the screen that detects the touch input may be as shown in FIG. 8. According to an embodiment, referring to FIG. 8, a touch input on the first screen 810 that displays at least one icon including a function menu may be detected. The touch input on the first screen 810 may be detected from an area where the contact information shortcut function menu 421 is displayed or a related area.

In operation 705, the electronic device may determine whether the detected touch input is a touch input for displaying a list related to a function menu. For example, the controller 130 may determine whether data associated with the detected touch input is a touch input for extending a function menu downward. Here, an input for displaying a list related to a function menu may be defined variously. According to an embodiment, an input for displaying a list related to a function menu may be defined as flicking down. The controller 130 may determine whether the detected touch input is a flicking down input for extending a function menu downward on the basis of the touch area, the touch direction, and the touch time of the detected touch input. For example, the controller 130 may determine a function menu to be extended on the basis of the touch input area of the detected touch input. As another example, the controller 130 may select a function menu to be extended on the basis of predetermined configuration information. When it is determined that the touch input is not an input for displaying a list related to a function menu, the electronic device may terminate the algorithm.

When it is determined that the touch input is an input for displaying a list related to a function menu, the electronic device may display a list related to a function menu according to the touch input in operation 707. For example, when it is determined that the detected touch input is a downward touch input on a predetermined function menu, the electronic device may display a list related to the corresponding function menu. That is, when it is determined that the detected input is a flicking down input, the controller 130 may determine the direction of the touch input, a touch area, and the type of touch input, may determine a function menu corresponding to the touch input and a list to be extended in associated with the corresponding function menu, and may display a modified screen including the list related to the function menu via the display 110. For example, the screen that displays a related list according to the touch input for extending a function menu may be as shown in FIG. 8. According to an embodiment, referring to FIG. 8, the screen that displays the list related to a function menu may be displayed as a second screen 820. The second screen 820 may include an extended list 821 related to the predetermined contact information shortcut function menu 421 (e.g., mom) according to the area of the touch input detected in operation 703. In this instance, the extended list 821 may include call/text logs associated with the corresponding contact information (mom), that is, a list of transmitted/received text, a list of transmitted/received calls, or a list of missed calls. The order of calls/text logs displayed on the screen may be arranged in the order of the latest transmission/reception. According to other embodiments, when a downward touch input on a predetermined contact information shortcut function menu is detected in a screen that displays a text/e-mail application as a single icon, a list of text/e-mails associated with the corresponding contact may be extended and displayed. According to other embodiments, when a downward touch input on a predetermined date/duration shortcut function menu is detected in a screen that displays a calendar application as a single icon, a schedule list related to the corresponding date/duration (e.g., on the date or within a week) may be extended and displayed.

Figure 9:
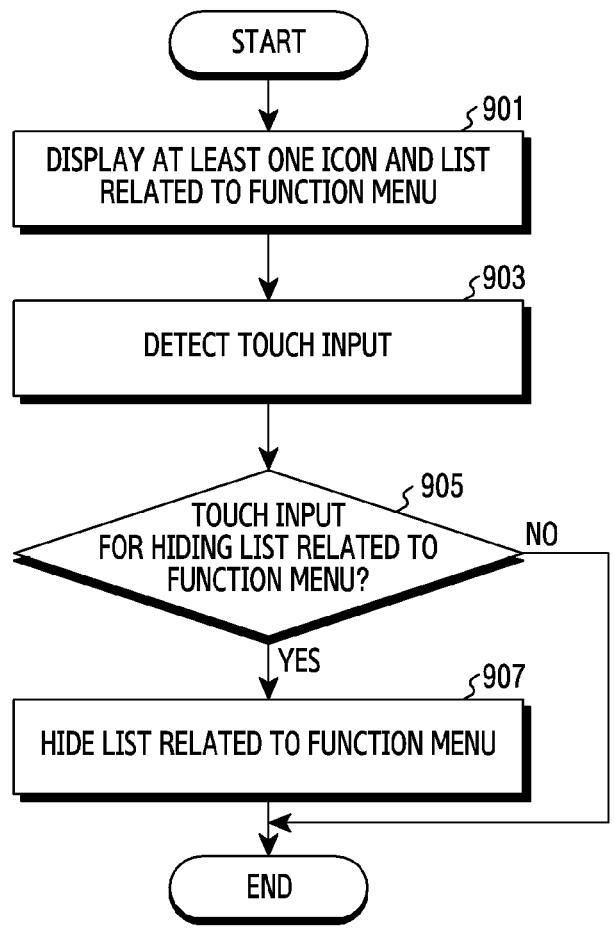
FIG. 9 is a flowchart illustrating a process of displaying a screen according to a touch input for hiding a list related to a function menu in an electronic device according to various embodiments.

FIG. 9 is a flowchart illustrating a process of displaying a screen according to a touch input for hiding a list related to a function menu in an electronic device according to various embodiments. FIG. 9 illustrates the operation method of the electronic device 100.

Figure 10:
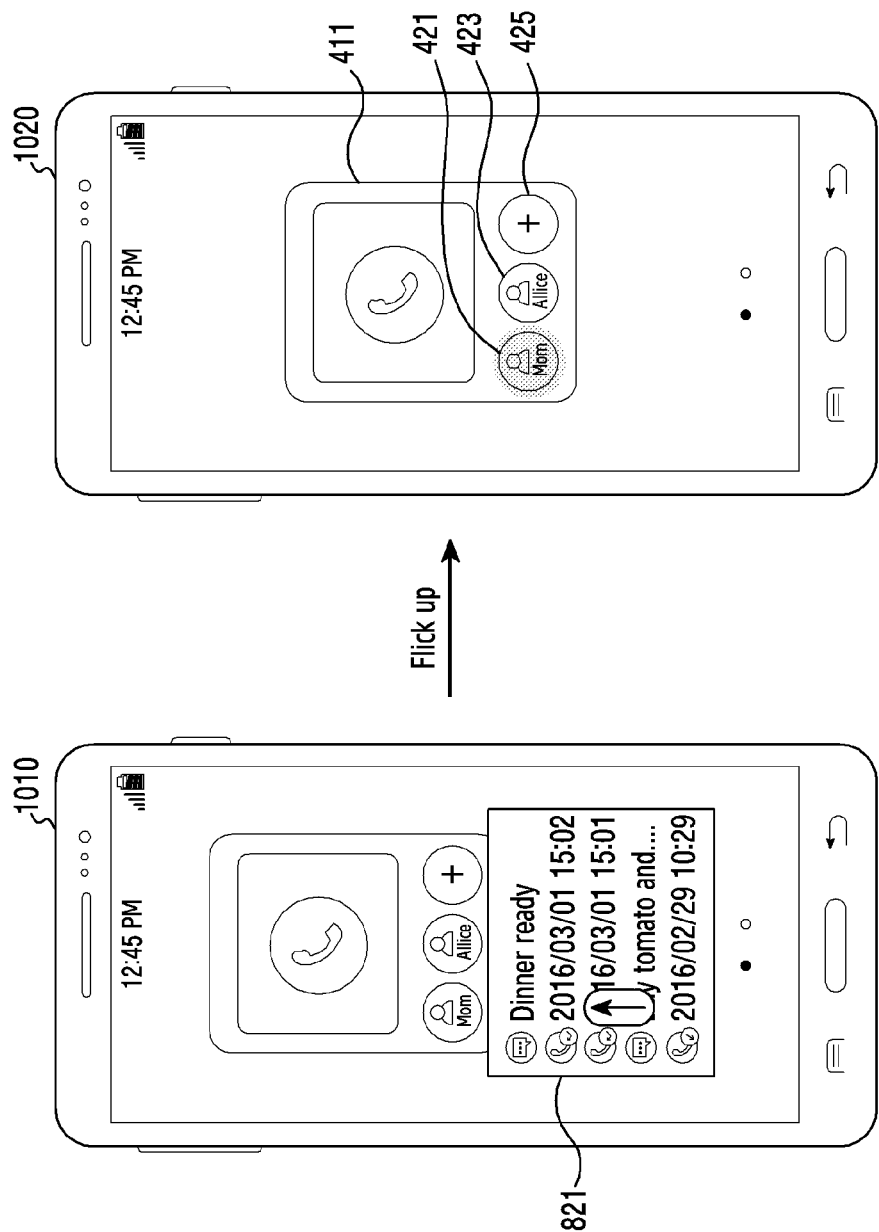
FIG. 10 is a flowchart illustrating an example of hiding a list related to a function menu according to a touch input for hiding a list related to a function menu in an electronic device according to various embodiments.

Referring to FIG. 9, the electronic device may display at least one icon and a list related to a function menu in operation 901. For example, the electronic device may display at least one icon and an extended list related to a predetermined function menu via the display 110. For example, a screen that displays an icon may be as shown in FIG. 10. According to an embodiment, referring to FIG. 10, the screen that displays at least one icon including an extended list associated with a predetermined function menu may be displayed as a first screen 1010. The first screen 1010 may include the icon of the call application 411. The icon of the call application 411 may include an extended list 821 related to the predetermined contact information shortcut function menu 421 (e.g., mom). In this instance, the extended list 821 may include call/text logs associated with the corresponding contact (mom), that is, a list of transmitted/received text, a list of transmitted/received calls, or a list of missed calls.

In operation 903, the electronic device may detect a touch input. For example, the electronic device may detect a touch input on the screen that displays at least one icon including a function menu via the display 110. According to an embodiment, the display 110 may detect a touch input such as a tap input, a double-tap input, a hold input, a drag-and-drop input, a press input, a pinch input, a stretch input, a slide input, a swipe input, a rotate input, a flicking input, or the like, and may provide data associated with the detected touch input to the controller 130. For example, the screen that detects the touch input may be as shown in FIG. 10. According to an embodiment, referring to FIG. 10, a touch input on the first screen 1010 that displays at least one icon including an extended list associated with a function menu may be detected. The touch input on the first screen 1010 may be detected from an area where the extended menu 821 related to a function menu is displayed or a related area.

In operation 905, the electronic device may determine whether the detected touch input is a touch input for hiding a list related to a function menu. For example, the controller 130 may determine whether the data associated with the detected touch input is an upward touch input on the list related to the function menu. Here, an input for hiding a list related to a function menu may be defined variously. According to an embodiment, an input for hiding a list related to a function menu may be defined as flicking up. The controller 130 may determine whether the detected touch input is a flicking up input on an extended list related to a predetermined function menu, on the basis of the touch area, the touch direction, and the touch time of the detected touch input. For example, the controller 130 may determine whether to hide the list related to the function menu on the basis of the touch input area of the detected touch input or the like. When an upward input on a predetermined item in the list is detected in the touch input area, it is determined that the input is an input for scrolling the list. When an upward input is detected in the entire list such as a function menu or the boundary of a list in the touch input area, it may be determined that the input is an input for scaling down or hiding the list. When it is determined that the touch input is not a touch input for hiding a list related to a function menu, the electronic device may terminate the algorithm.

When it is determined that the touch input is an input for hiding a list related to a function menu, the electronic device may hide the list related to the function menu in operation 907. For example, when it is determined that the detected touch input is an upward touch input to the entirety of the list related to a predetermined function menu, the electronic device may hide the list related to the corresponding function menu. That is, when it is determined that the detected input is a flicking up input, the controller 130 may determine the direction of the touch input, a touch area, and the type of touch input, may determine to hide an extended list related to a function menu corresponding to the touch input, and may display a screen where the list related to the function menu is rolled up and disappears, via the display 110. For example, the screen, displayed according to a touch input for hiding the extended list related to the function menu, is as shown in FIG. 10. According to an embodiment, referring to FIG. 10, the screen that hides the list related to the function menu may be displayed as a second screen 1020. The second screen 1020 may be displayed as a screen excluding the extended list 821 related to the predetermined contact information shortcut function menu 421 (e.g., mom) according to the area of the touch input detected in operation 903. The screen excluding the extended list 821 may be displayed in the form of a single icon screen including the icon of the call application 411. According to an embodiment, the at least one icon may be displayed in the form of a widget. The icon of the call application 411 may include the predetermined contact information shortcut function menus 421 and 423 (e.g., mom, Alice, and the like), and the shortcut addition function menu 425. According to other embodiments, the screen that displays at least one icon including a function menu may include a plurality of icons configured in a 2×2 disposition as shown in the second screen 420 of FIG. 4A.

Figure 11:
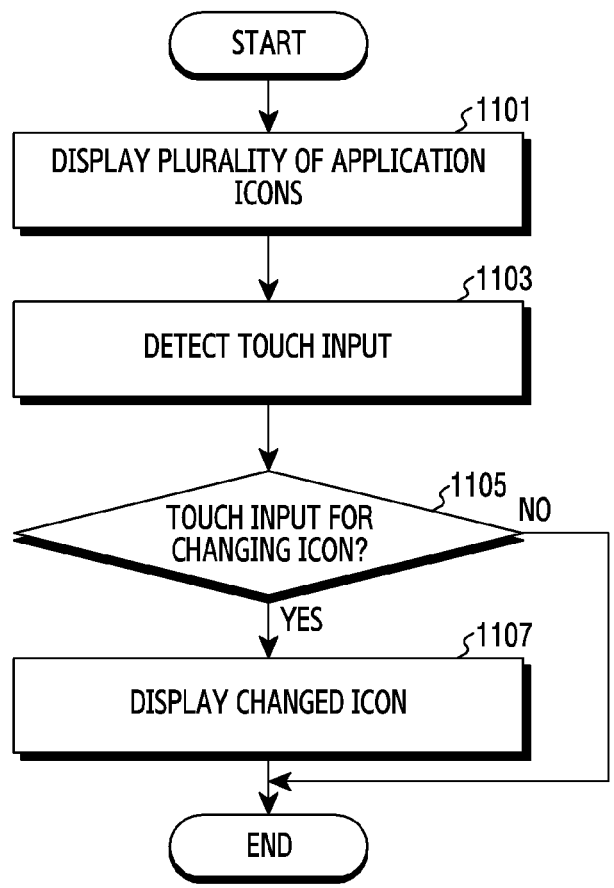
FIG. 11 is a flowchart illustrating a process of displaying a screen according to a touch input for changing an icon in an electronic device according to various embodiments.

FIG. 11 is a flowchart illustrating a process of displaying a screen according to a touch input for changing an icon in an electronic device according to various embodiments. FIG. 11 illustrates the operation method of the electronic device 100.

Figure 12:
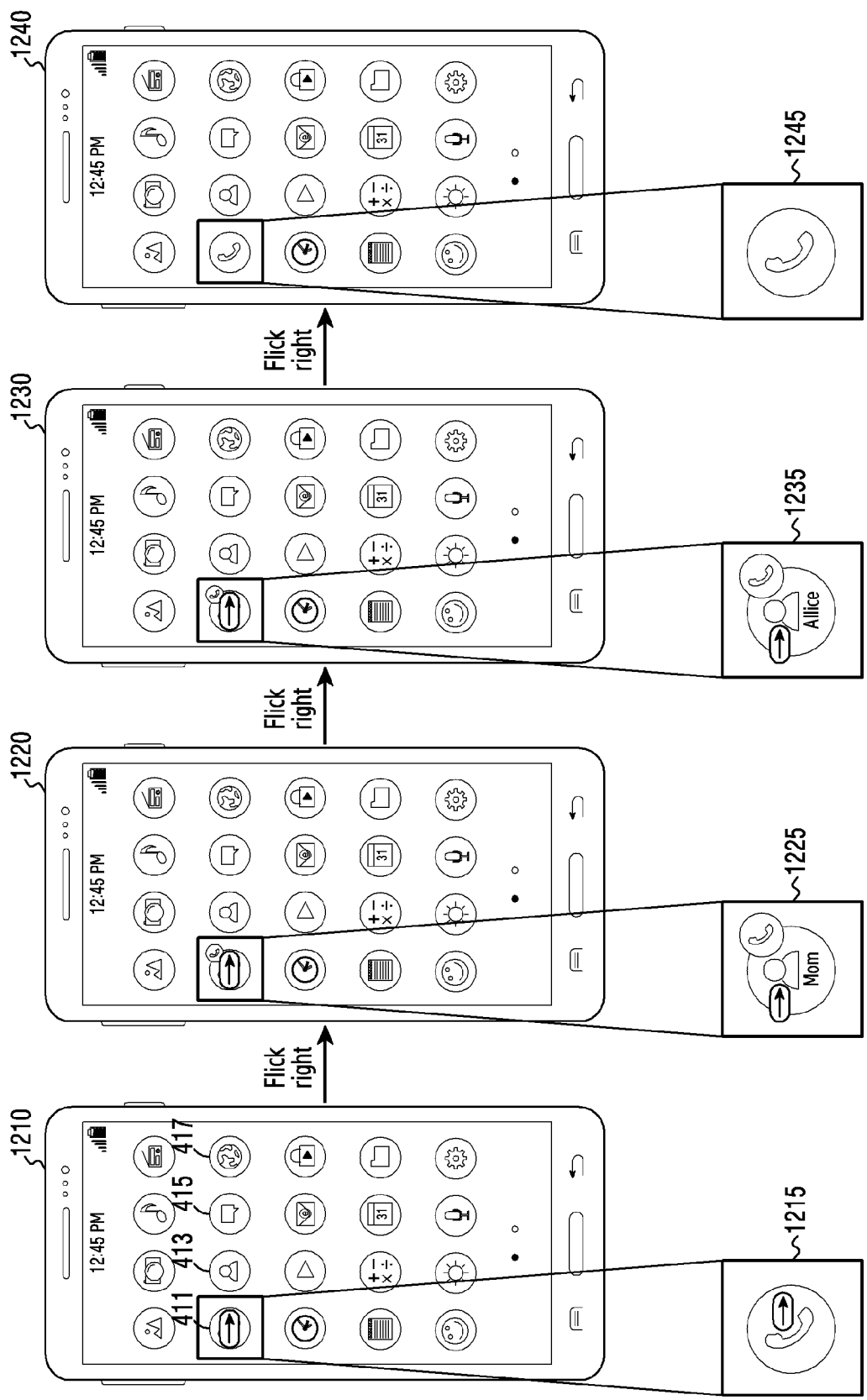
FIG. 12 is a flowchart illustrating an example of displaying a changed icon according to a touch input for changing an icon in an electronic device according to various embodiments.

Referring to FIG. 11, the electronic device may display icons of a plurality of applications in operation 1101. For example, the electronic device may display a plurality of application icons via the display 110. According to an embodiment, when a home screen is displayed in the electronic device, such as a smart phone, a screen including icons of a plurality of applications may be displayed. For example, the screen that displays an icon may be as shown in FIG. 12. According to an embodiment, referring to FIG. 12, the screen that displays a plurality of icons may be displayed as a home screen such as a first screen 1210. The first screen 1210 may include simple icons associated with various applications such as a picture, a camera, a media player, and the like. Particularly, the first screen 1210 may include icons of the communication application 411, the contact information application 413, the message application 415, and the web browser application 417.

In operation 1103, the electronic device may detect a touch input. For example, the electronic device may detect a touch input on a screen that displays a plurality of application icons via the display 110. According to an embodiment, the display 110 may detect a touch input such as a tap input, a double-tap input, a hold input, a drag-and-drop input, a press input, a pinch input, a stretch input, a slide input, a swipe input, a rotate input, a flicking input or the like, and may provide data associated with the detected touch input to the controller 130. For example, the screen that detects the touch input may be as shown in FIG. 12. According to an embodiment, referring to FIG. 12, a touch input on the first screen 1210 that displays a plurality of application icons may be detected. The touch input on the first screen 1210 may be detected from an area where the icon of the call application 411 is displayed or a related area.

In operation 1105, the electronic device determines whether the detected touch input is an input for changing an icon. For example, the controller 130 may determine whether data associated with the detected touch input is an input for changing an icon rightward or leftward from a predetermined icon. Here, an input for changing an icon may be defined variously. According to an embodiment, an input for changing an icon may be defined as a flicking right input or a flicking left input. The controller 130 may determine whether the detected touch input is a flicking right input or a flicking left input on a predetermined icon, on the basis of the touch area, the touch direction, and the touch time of the detected touch input. For example, the controller 130 may determine whether to change an icon on the basis of the touch input area of the detected touch input. When the touch input area where the touch input is detected is an area on a predetermined icon or a set related area, it is determined that the touch input is an input requesting changing of an icon. When it is determined that the touch input is not an input for changing a predetermined icon, the electronic device may terminate the algorithm.

When it is determined that the touch input is an input for changing a predetermined icon, the electronic device may display a changed icon in operation 1107. For example, when it is determined that the detected touch input is a rightward touch input on a predetermined icon, the electronic device may display an icon which the corresponding icon is changed to. That is, when it is determined that the detected input is a flicking right input, the controller 130 may determine the direction of the touch input, a touch area, the type of touch input, and the like, may determine to change an icon which corresponds to the corresponding touch input, and may change the icon to a shortcut icon of predetermined contact information and display the same via the display 110. For example, the screen displayed according to the touch input for changing an icon may be as shown in FIG. 12. According to an embodiment, referring to FIG. 12, the screen that displays a changed icon may be displayed as a second screen 1220, a third screen 1230, or a fourth screen 1240. The second screen 1220 may change the icon of the call application 411 depending on the area of the touch input detected in operation 1103 and the number of times that a touch input is provided, and may display a changed icon. When a flicking right input is detected once, the second screen 1220 may display a screen including a predetermined contact information shortcut icon 1225 (e.g., mom) which is changed from a call application icon 1215. When a flicking right input is detected two times, the third screen 1230 may display a screen including a predetermined contact information shortcut icon 1235 (e.g., Alice) which is changed from the predetermined contact information shortcut icon 1225 (e.g., mom). When a flicking right input is detected three times, the fourth screen 1240 may display a screen including a call application icon 1245 which is changed again from the predetermined contact information shortcut icon 1235 (e.g., Alice). A contact information shortcut icon to be changed to may be determined on the basis of contact information set in advance by a user. When three or more pieces of contact information are set, an icon may be changed to a corresponding contact information shortcut icon depending on the number of times that a flicking right input is provided. According to embodiments, an icon to be changed to and the order of icons may be determined on the basis of the order of contact information frequently used or contact information recently used, and a predetermined number of pieces of contact information may be automatically registered or retrieved. When a flicking right touch input on a text/e-mail application icon is detected, a changed icon may be displayed according to the frequently used contact information or recently used contact information.

According to other embodiments, when the touch input is a flicking left touch input, which is a leftward input, on a predetermined icon, the electronic device may change an icon in reverse order, such as the order of the shortcut icons 1245, 1235, 1225, and 1215 of FIG. 12.

Figure 13:
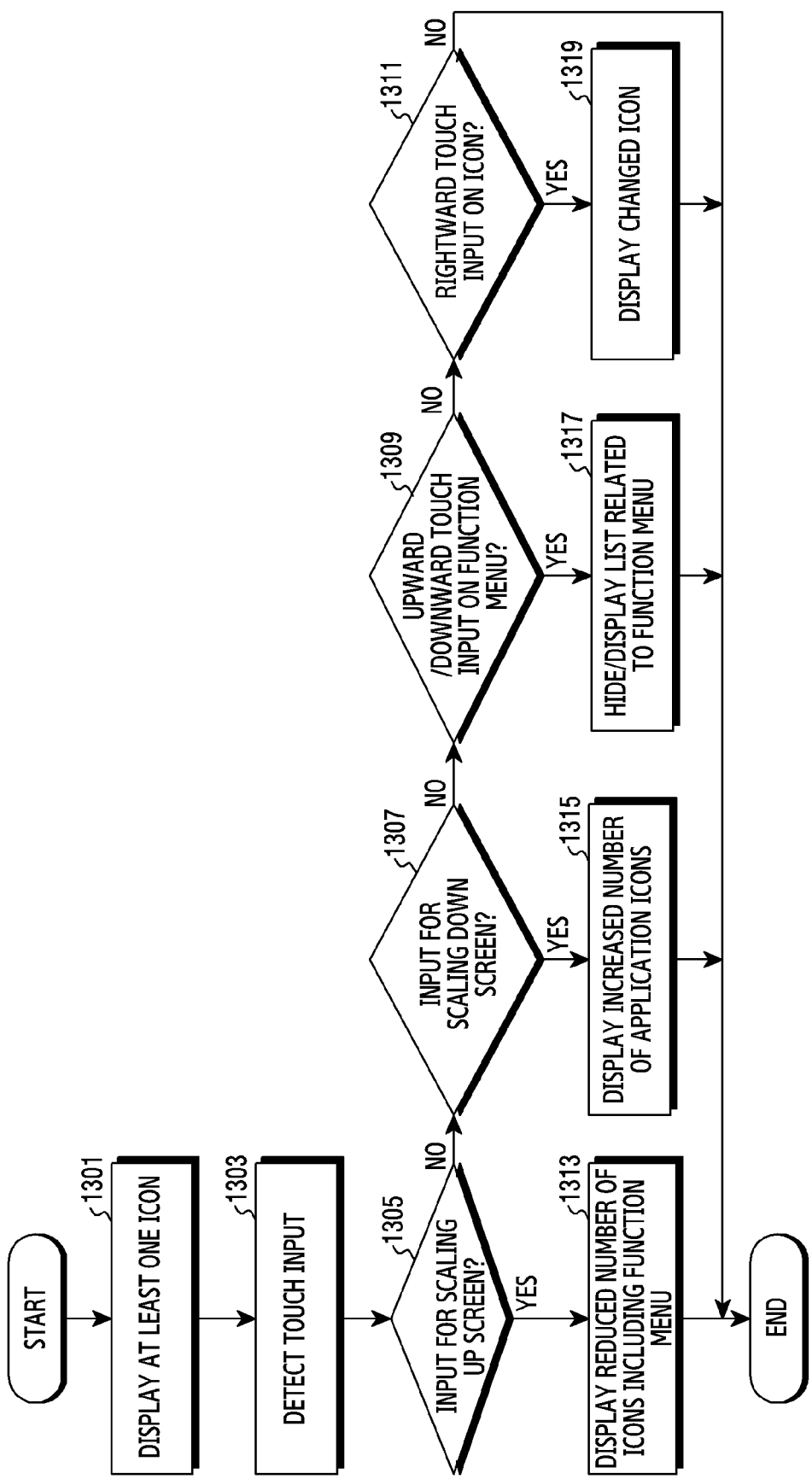
FIG. 13 is a flowchart illustrating a process of displaying a screen according to various touch inputs in an electronic device according to various embodiments.

FIG. 13 is a flowchart illustrating a process of displaying a screen according to various touch inputs in an electronic device according to various embodiments. FIG. 13 illustrates the operation method of the electronic device 100.

Referring to FIG. 13, the electronic device may display at least one icon in operation 1301. For example, the electronic device may display at least one application icon via the display 110. According to an embodiment, the at least one icon may be displayed in the form of a widget. The screen that displays an icon may be at least one of a home screen including a plurality of icons, a screen including icons arranged in a 2×2 disposition or a 3×4 disposition, and a screen including a single icon.

In operation 1303, the electronic device may detect a touch input. For example, the electronic device may detect a touch input on a screen that displays at least one icon including a function menu via the display 110. According to an embodiment, the display 110 may detect a touch input such as a tap input, a double-tap input, a hold input, a drag-and-drop input, a press input, a pinch input, a stretch input, a slide input, a swipe input, a rotate input, a flicking input or the like, and may provide data associated with the detected touch input to the controller 130.

In operation 1305, the electronic device determines whether the detected touch input is an input for scaling up a screen. For example, the controller 130 may determine whether data associated with the detected touch input is a touch input for scaling up a screen. According to an embodiment, the controller 130 may determine whether the detected touch input is a pinch zoom-in input for scaling up a screen on the basis of the touch area, the touch direction, and the touch time of the detected touch input. In this instance, the controller 130 may select application icons to be displayed on the scaled-up screen on the basis of the touch input of the detected touch input. For example, when it is determined that the touch input is an input for scaling up a screen, the electronic device may proceed with operation 1313. When it is determined that the touch input is not an input for scaling up a screen, the electronic device may proceed with operation 1307.

In operation 1307, the electronic device determines whether the detected touch input is an input for scaling down a screen. For example, the controller 130 may determine whether the data associated with the detected touch input is a touch input for scaling down a screen. According to an embodiment, the controller 130 may determine whether the detected touch input is a pinch zoom-out input for scaling down a screen on the basis of the touch area, the touch direction, and the touch time of the detected touch input. In this instance, the controller 130 may determine a scaled-down screen configuration to be displayed on the basis of the detected touch input. For example, when it is determined that the touch input is an input for scaling down a screen, the electronic device may proceed with operation 1315. When it is determined that the touch input is not an input for scaling down a screen, the electronic device may proceed with operation 1309.

In operation 1309, the electronic device may determine whether the detected touch input is an upward/downward touch input for hiding/displaying a list related to a function menu. For example, the controller 130 may determine whether the data associated with the detected touch input is a touch input for hiding/extending a function menu upward/downward. According to an embodiment, the controller 130 may determine whether the detected touch input is a flicking up/down input for extending a function menu upward/downward on the basis of the touch area, the touch direction, and the touch time of the detected touch input. In this instance, the controller 130 may determine whether to hide a list related to a function menu or to extend a function menu on the basis of the touch input area of the detected touch input. For example, when it is determined that the touch input is an upward/downward touch input on a predetermined function menu, the electronic device may proceed with operation 1317. When it is determined that the touch input is not a downward touch input on a predetermined function menu, the electronic device may proceed with operation 1311.

In operation 1311, the electronic device determines whether the detected touch input is a rightward touch input for changing an icon. According to other embodiments, the electronic device may determine whether the detected touch input is a rightward or leftward touch input for changing an icon. Here, an input for changing an icon may be defined variously. According to an embodiment, an input for changing an icon may be defined as a flicking right input or a flicking left input. The controller 130 may determine whether the detected touch input is a flicking right input or a flicking left input on a predetermined icon, on the basis of the touch area, the touch direction, and the touch time of the detected touch input. In this instance, the controller 130 may determine whether to change an icon on the basis of the touch input area of the detected touch input. When the touch input area where the touch input is detected is an area on a predetermined icon or a set related area, it is determined that the touch input is an input requesting changing of an icon. For example, when it is determined that the touch input is a rightward or leftward touch input on a predetermined icon, the electronic device may proceed with operation 1319. When it is determined that the touch input is not a rightward or leftward touch input on a predetermined icon, the electronic device may terminate the algorithm.

Subsequently, in operation 1313, the electronic device may display a reduced number of icons including at least one function menu according to the touch input. For example, when it is determined that the detected touch input is a touch input for scaling up a screen in operation 1305, the electronic device may modify at least one icon, determined on the basis of the touch input, to be in a form including at least one function menu, and may display the same. That is, when it is determined that the detected input is a pinch zoom-in input, the controller 130 may determine the direction of the touch input, a touch area, the type of touch input, and the like, may determine an icon corresponding to the corresponding touch input and a screen to be modified to, and may display the screen that displays the at least one modified icon via the display 110.

In operation 1315, the electronic device may display an increased number of application icons according the touch input. For example, when it is determined that the detected touch input is a touch input for scaling down a screen in operation 1307, the electronic device may display an increased number of application icons including at least one icon displayed in operation 1301. That is, when it is determined that the detected input is a pinch zoom-out input, the controller 130 may determine the direction of the touch input, a touch area, the type of touch input, and the like, may determine an icon corresponding to the corresponding touch input and a screen to be modified to, and may display the modified screen including an increased number of application icons via the display 110.

In operation 1317, the electronic device may hide/display a list related to a function menu according to the touch input. For example, when it is determined that the detected touch input is an upward/downward touch input on a predetermined function menu in operation 1309, the electronic device may hide or display the list related to the corresponding function menu. That is, when it is determined that the detected input is a flicking up or down input, the controller 130 may determine the direction of the touch input, a touch area, and the type of touch input, may determine a function menu corresponding to the touch input and a list to be extended in associated with the corresponding function menu, and may display a modified screen excluding or including the list related to the function menu via the display 110.

In operation 1319, the electronic device may display a changed icon. For example, when it is determined that the detected touch input is a rightward or leftward touch input on a predetermined icon, the electronic device may display an icon changed from the corresponding icon. That is, when it is determined that the detected input is a flicking right or left input in operation 1311, the controller 130 may determine the direction of the touch input, a touch area, the type of touch input, and the like, may determine to change an icon which correspond to the corresponding touch input, and may change the icon to a shortcut icon associated with predetermined contact information and display the same via the display 110.

When displaying a screen modified according to the touch input is completed, the electronic device terminates the algorithm.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by an electronic device, the method comprising:
   displaying a plurality of icons for a plurality of applications on a screen; and
   when a leftward touch input or a rightward touch input on a first icon of the plurality of icons is detected, changing, depending on a number of times that the leftward touch input or rightward touch input on the first icon is provided, the first icon to a first shortcut icon associated with the first icon and displaying the first shortcut icon,
   wherein the first shortcut icon is an interface element for immediately executing a function of at least one application of the plurality of applications, and
   wherein the first shortcut icon is automatically registered based on an order of contact information recently used.

2. The method of claim 1, further comprising:
   when a leftward touch input or a rightward touch input on a second icon of the plurality of icons is detected, changing, depending on the number of times that the leftward touch input or the rightward touch input on the second icon is provided, the second icon to a second shortcut icon associated with the second icon and displaying the second shortcut icon,
   wherein the second shortcut icon is an interface element for immediately executing a function of at least one application of the plurality of applications, and
   wherein the second shortcut icon is automatically registered based on a reverse order of the contact information recently used.

3. The method of claim 1, wherein the first icon of the plurality of icons is determined on the basis of at least one of a touch input area and a touch time associated with the leftward touch input or the rightward touch input detected via the screen.

4. The method of claim 1, wherein the at least one application includes a call application, wherein the first shortcut icon includes a shortcut icon of contact information that is frequently used.

5. The method of claim 1, wherein the leftward touch input or the rightward touch input on the first icon includes a flicking left or flicking right touch input.

6. An electronic device, comprising:
   a display; and
   at least one processor functionally connected to the display,
   wherein the at least one processor is configured to:
      display a plurality of icons for a plurality of applications on a screen,
      when a leftward touch input or a rightward touch input on a first icon of the plurality of icons is detected, change, depending on a number of times that the leftward touch input or the rightward touch input on the first icon is provided, the first icon to a first shortcut icon associated with the first icon, and
      display the first shortcut icon,
   wherein the first shortcut icon is an interface element for immediately executing a function of at least one application of the plurality of applications, and
   wherein the first shortcut icon is automatically registered based on an order of contact information recently used.

7. The electronic device of claim 6, wherein the at least one processor is configured to:
   when a leftward touch input or a rightward touch input on a second icon of the plurality of icons is detected, change the second icon to a second shortcut icon associated with the second icon and display the second shortcut icon,
   wherein the second shortcut icon is an interface element for immediately executing a function of at least one application of the plurality of applications, and
   wherein the second shortcut icon is automatically registered based on a reverse order of contact information recently used.

8. The electronic device of claim 7,
   wherein the at least one application includes a call application, and
   wherein the second shortcut icon includes a shortcut icon of contact information.

9. The electronic device of claim 6, wherein the first icon of the plurality of icons is determined on the basis of at least one of a touch input area and a touch time associated with the leftward touch input or the rightward touch input detected via the screen.

10. The electronic device of claim 6, wherein the at least one application includes a call application, and wherein the first shortcut icon includes a shortcut icon of contact information that is frequently used.

11. The electronic device of claim 6, wherein the leftward touch input or the rightward touch input on the first icon includes a flicking left or flicking right touch input.

* * * * *